US012567273B2

(12) United States Patent
Siddiqui et al.

(10) Patent No.: US 12,567,273 B2
(45) Date of Patent: Mar. 3, 2026

(54) TRAINING NATURAL LANGUAGE PROCESSING MODELS USING MODIFIED CROSS ENTROPY LOSS FUNCTIONS

(71) Applicant: NantHealth, Inc., Culver City, CA (US)

(72) Inventors: Matheen Siddiqui, Long Beach, CA (US); Andrea Melissa Preble, Santa Cruz, CA (US); Preeti Jain, Fremont, CA (US); Kathleen Marie Petri Seiler, Williston, VT (US)

(73) Assignee: NantHealth, Inc., Culver City, CA (US)

( * ) Notice: Subject to any disclaimer, the term of this patent is extended or adjusted under 35 U.S.C. 154(b) by 295 days.

(21) Appl. No.: 18/310,407

(22) Filed: May 1, 2023

(65) Prior Publication Data

US 2024/0371187 A1     Nov. 7, 2024

(51) Int. Cl.
*G06V 30/19* (2022.01)

(52) U.S. Cl.
CPC .... *G06V 30/19173* (2022.01); *G06V 30/1916* (2022.01)

(58) Field of Classification Search
CPC ..................... G06V 30/19173; G06V 30/1916
See application file for complete search history.

(56) References Cited

U.S. PATENT DOCUMENTS 9,672,205 B2 * 6/2017 Miller ................... G06F 40/295
9,852,379 B2 * 12/2017 Beigman Klebanov ....................
                                                    G06N 7/01
2005/0049852 A1 * 3/2005 Chao ....................... G06F 40/30
                                                    704/9
2011/0276553 A1 * 11/2011 Chen ..................... G06F 16/353
                                                    707/706
2015/0074507 A1 * 3/2015 Riediger ............... G06F 16/313
                                                    715/230
2019/0102614 A1 * 4/2019 Winder .................. G06F 40/42
2019/0206524 A1 * 7/2019 Baldwin ............... G06F 40/169
2019/0266450 A1 * 8/2019 van Rensburg ...... G06V 40/174
2019/0386949 A1 * 12/2019 Vennam ................ H04L 65/403
2020/0177529 A1 * 6/2020 Trim ...................... H04L 51/10
2021/0042290 A1 * 2/2021 Banipal ............... G06F 16/2365
2022/0058348 A1 * 2/2022 He ....................... G06F 16/3344

FOREIGN PATENT DOCUMENTS

WO     WO-2015074071 A1 *  5/2015  ........... G06F 40/169

* cited by examiner

*Primary Examiner* — Huo Long Chen
(74) *Attorney, Agent, or Firm* — STETINA GARRED BRUCKER & NEWBOLES

(57) ABSTRACT

Methods of training a natural language processing (NLP) model comprise storing classification data associated with a plurality of words, defining model input data associated with each of the plurality of words, evaluating a cross entropy loss function to derive a loss value, and adjusting the NLP model according to the loss value derived from the cross entropy loss function. The cross entropy loss function may be defined to include one or more special loss terms to support training of the NLP model on the basis of incomplete classification data, such as in cases where not all possible classes are considered by the annotator, where not all words are provided with annotated classes, where consensus has not been reached between annotators, and/or where not all classes have been defined.

17 Claims, 10 Drawing Sheets

Figure 2:
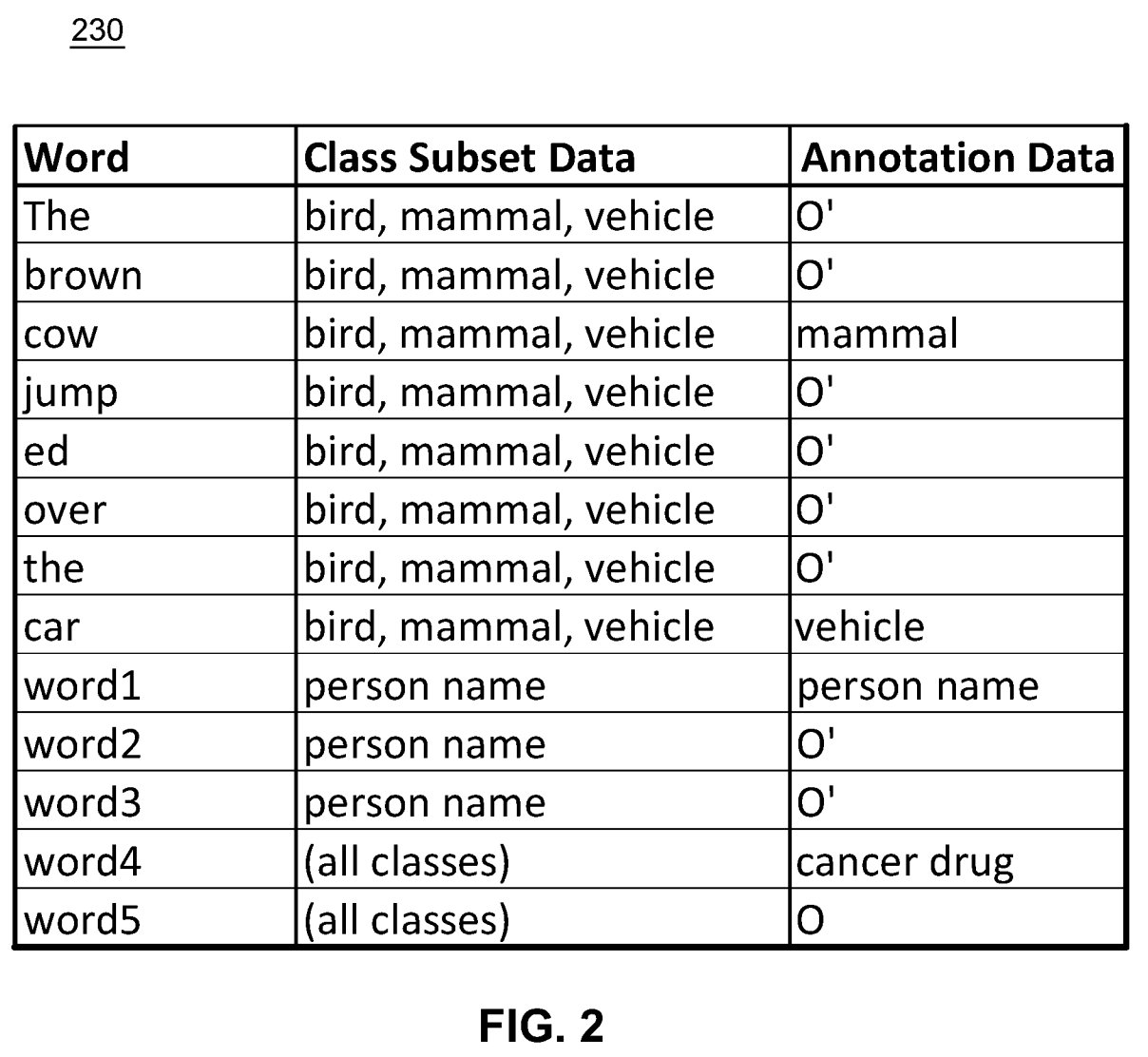

230

| Word | Class Subset Data | Annotation Data |
|------|-------------------|-----------------|
| The | bird, mammal, vehicle | O' |
| brown | bird, mammal, vehicle | O' |
| cow | bird, mammal, vehicle | mammal |
| jump | bird, mammal, vehicle | O' |
| ed | bird, mammal, vehicle | O' |
| over | bird, mammal, vehicle | O' |
| the | bird, mammal, vehicle | O' |
| car | bird, mammal, vehicle | vehicle |
| word1 | person name | person name |
| word2 | person name | O' |
| word3 | person name | O' |
| word4 | (all classes) | cancer drug |
| word5 | (all classes) | O |

| Word | Class Subset Data | Annotation Data | |
|------|-------------------|-----------------|---|
| The | bird, mammal, vehicle | O' | |
| brown | bird, mammal, vehicle | O' | |
| cow | bird, mammal, vehicle | mammal | |
| jump | bird, mammal, vehicle | O' | |
| ed | bird, mammal, vehicle | O' | |
| over | bird, mammal, vehicle | O' | |
| the | bird, mammal, vehicle | O' | |
| car | bird, mammal, vehicle | vehicle | |
| word1 | bird, mammal, vehicle | X | |
| word2 | bird, mammal, vehicle | X | |
| word3 | bird, mammal, vehicle | X | |
| word4 | bird, mammal, vehicle | X | |
| word5 | bird, mammal, vehicle | X | |

| Word | Class Subset Data | Annotation Data |
|------|-------------------|-----------------|
| The | bird, mammal, vehicle, machine | O' |
| brown | bird, mammal, vehicle, machine | O' |
| cow | bird, mammal, vehicle, machine | mammal |
| jump | bird, mammal, vehicle, machine | O' |
| ed | bird, mammal, vehicle, machine | O' |
| over | bird, mammal, vehicle, machine | O' |
| the | bird, mammal, vehicle, machine | O' |
| car | bird, mammal, vehicle, machine | vehicle, machine |
| word1 | person name | person name |
| word2 | person name | O' |
| word3 | person name | O' |
| word4 | (all classes) | cancer drug |
| word5 | (all classes) | O |

| Word | Hierarchical Tree Structure | Annotation Data |
|------|------------------------------|-----------------|
| The | (tree data) | B |
| brown | (tree data) | C |
| cow | (tree data) | A.A |
| jump | (tree data) | D |
| ed | (tree data) | B |
| over | (tree data) | B |
| the | (tree data) | B |
| car | (tree data) | A.B (--> A.B.A, A.B.B) |
| word1 | (tree data) | ... |
| word2 | (tree data) | ... |
| word3 | (tree data) | ... |
| word4 | (tree data) | ... |
| word5 | (tree data) | ... |

FIG. 8

STORE CLASSIFICATION DATA — 910

DEFINE HIERARCHICAL TREE STRUCTURE RELATING CLASSES — 920

DEFINE MODEL INPUT DATA — 930

DEFINE CROSS ENTROPY LOSS FUNCTION TO ACCOUNT FOR INCOMPLETE CLASSIFICATION DATA — 940

EVALUATE CROSS ENTROPY LOSS FUNCTION — 950

ADJUST MODEL ACCORDING TO LOSS VALUE — 960

TRAINING NATURAL LANGUAGE PROCESSING MODELS USING MODIFIED CROSS ENTROPY LOSS FUNCTIONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

When training natural language processing (NLP) models, the biggest bottleneck is producing labeled datasets. This is because training a model does not scale with respect to the annotation load. Requiring annotators to label every word in a given text fragment to be fed to the model may have acceptable efficiency if the label set is small (e.g., less than 5 classes) and the datasets are small. However, in many practical settings, it is not uncommon to have 10s to 100s of labels. As the number of labels increases, the cognitive load required for a user to label each word increases, resulting in increased time required to label each word as well as reduced quality of those labels, which itself may lead to inconsistencies between annotations made by different annotators (requiring correction to achieve consensus). The problem is exacerbated when one considers that the label set itself may be revised over time, with new labels being added from one iteration of training the model to the next. When this occurs, it may be necessary to go back and relabel text fragments that have already been labeled in order to apply the revised label set.

BRIEF SUMMARY

The present disclosure contemplates various systems and methods for overcoming the above drawbacks accompanying the related art. One aspect of the embodiments of the present disclosure is a method of training a natural language processing (NLP) model. The method may comprise storing classification data associated with a plurality of words. The classification data may include, for each of the plurality of words, class subset data representative of a subset of classes under consideration for the word and annotation data representative of an annotation of the word. The annotation of at least one of the plurality of words may indicate an annotated class of the word from among the subset of classes under consideration. The annotation of another at least one of the plurality of words may indicate that the word does not belong to any class from among the subset of classes under consideration. The method may further comprise defining model input data associated with each of the plurality of words, evaluating a cross entropy loss function to derive a loss value, and adjusting the NLP model according to the loss value derived from the cross entropy loss function. The cross entropy loss function may have a first loss term for each item of the model input data that is associated with a word whose annotation data represents an annotation indicating an annotated class of the word from among the subset of classes under consideration. The first loss term may define a cross entropy loss between model output data representative of the NLP model's predicted class membership of the word and the annotation data of the word. The cross entropy loss function may have a second loss term for each item of the model input data that is associated with a word whose annotation data represents an annotation indicating that the word does not belong to any class from among the subset of classes under consideration. The second loss term may define a probability of the NLP model's predicted class membership of the word not being among the subset of classes under consideration.

For at least one of the plurality of words, the subset of classes under consideration for the word may contain a single specified class under consideration.

Another aspect of the embodiments of the present disclosure is a method of training a natural language processing (NLP) model. The method may comprise storing classification data associated with a plurality of words. The classification data may include, for each of the plurality of words, annotation data representative of an annotation of the word. The annotation of at least one of the plurality of words may indicate an annotated class of the word. The annotation of another at least one of the plurality of words may indicate that the word is not to be classified by the model. The method may further comprise defining model input data associated with each of the plurality of words, evaluating a cross entropy loss function to derive a loss value, and adjusting the NLP model according to the loss value derived from the cross entropy loss function. The cross entropy loss function may define, for each item of the model input data, a weighted cross entropy loss between model output data representative of the NLP model's predicted class membership of the word and the annotation data of the word. The weighted cross entropy loss for a word whose annotation indicates that the word is not to be classified by the model may be given less weight.

Another aspect of the embodiments of the present disclosure is a method of training a natural language processing (NLP) model. The method may comprise storing classification data associated with a plurality of words. The classification data may include, for each of the plurality of words, annotation data representative of one or more annotations of the word indicating an annotated class of the word. The annotation data of at least one of the plurality of words may be representative of two or more annotations indicating different annotated classes of the word. The method may further comprise defining model input data associated with each of the plurality of words, evaluating a cross entropy loss function to derive a loss value, and adjusting the NLP model according to the loss value derived from the cross entropy loss function. The cross entropy loss function may define, for each item of the model input data, a cross entropy loss between model output data representative of the NLP model's predicted class membership of the word and the annotation data of the word. For each item of the model input data whose annotation data represents two or more annotations indicating different annotated classes of the word, the cross entropy loss function may define a probability of the NLP model's predicted class membership of the word being among the different annotated classes.

Another aspect of the embodiments of the present disclosure is a method of training a natural language processing (NLP) model. The method may comprise storing classification data associated with a plurality of words. The classification data may include, for each of the plurality of words, annotation data representative of an annotation of the word indicating an annotated class of the word from among a plurality of classes. The method may further comprise defining a hierarchical tree structure relating the plurality of classes, at least one of the classes being an ancestor class to one or more of the plurality of classes including at least one childless class. The method may further comprise defining model input data associated with each of the plurality of words, evaluating a cross entropy loss function to derive a loss value, and adjusting the NLP model according to the loss value derived from the cross entropy loss function. The cross entropy loss function may define, for each item of the model input data, a cross entropy loss between model output data representative of the NLP model's predicted class membership of the word and the annotation data of the word. For each item of the model input data whose annotation data represents an ancestor class to one or more of the plurality of classes including at least one childless class, the cross entropy loss function may define a probability of the NLP model's predicted class membership of the word being among the at least one childless class.

Another aspect of the embodiments of the present disclosure is a computer program product comprising one or more non-transitory program storage media on which are stored instructions executable by one or more processors or programmable circuits to perform operations for training a natural language processing (NLP) model. The operations may comprise the steps of any of the above methods.

Another aspect of the embodiments of the present disclosure is a system for training a natural language processing (NLP) model. The system may comprise one or more databases for storing classification data associated with a plurality of words and one or more computers for defining model input data associated with each of the plurality of words, evaluating a cross entropy loss function to derive a loss value, and adjusting the NLP model according to the loss value derived from the cross entropy loss function. The cross entropy loss function may be that of any of the above methods.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 shows example contents of one or more databases of the system;

FIG. 4 shows further example contents of the one or more databases;

FIG. 6 shows further example contents of the one or more databases;

FIG. 8 shows further example contents of the one or more databases;

DETAILED DESCRIPTION

The present disclosure encompasses various embodiments of systems and methods for training a natural language processing (NLP) model. The detailed description set forth below in connection with the appended drawings is intended as a description of several currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
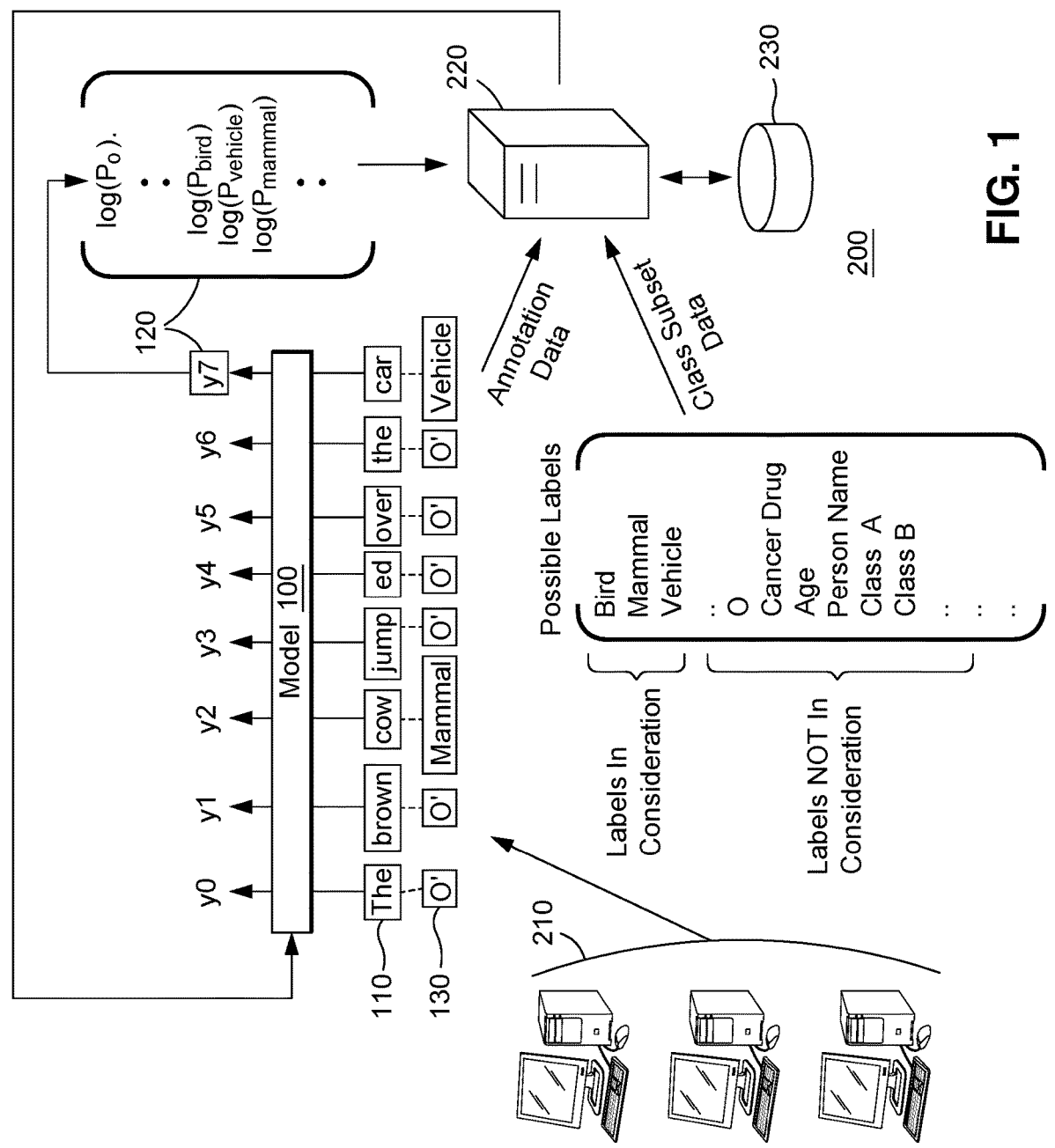
FIG. 1 shows an example natural language processing (NLP) model along with a system for training the NLP model in accordance with various embodiments of the disclosed subject matter.

FIG. 1 shows an example NLP model 100 along with a system 200 for training the NLP model 100 in accordance with various embodiments of the disclosed subject matter. The NLP model 100 may, in general, interpret input data 110 representative of natural language to produce output data 120 (e.g., y0, y1, etc.) representative of the model's predicted class membership of each item of the input data 110. In the example shown, the model input data 110 is associated with a plurality of words ("The," "brown," "cow," "jumped," "over," "the," "car"), with each item of input data 110 corresponding to a word, a group of words, or a portion of a word (e.g., the root "jump" and suffix "ed" may be separately mapped to two items of input data 110). For each item of input data 110, the model output data 120 may represent the predicted class membership as a vector or other set of probabilities that the item of input data 110 belongs to each of a plurality of classes (e.g., bird, vehicle, mammal, etc.). As depicted in FIG. 1, these raw probabilities output by the NLP model 100 may typically be unnormalized probabilities such as log probabilities (e.g., $\log(P_{bird})$, $\log(P_{vehicle})$, $\log(P_{mammal})$, etc.), which may be referred to as logits in a machine learning context. In the case of the word "car" as shown in FIG. 1, it may be expected that the logit having the highest value is $\log(P_{vehicle})$, for example.

The system 200 for training the NLP model 100 may include one or more annotator interfaces 210 such as local or remote terminals that may communicate with one or more computers 220 over a network such as the Internet. The annotator interfaces 210 may be used by annotators (e.g., human annotators) to assign labels to or otherwise classify words, groups of words, or portions of words in a set of documents, with the resulting annotation data 130 being compared with the model output data 120 to evaluate how accurately the NLP model 100 predicts the correct classes of the input data 110. In this regard, it should be noted that the same groups or portions of words that might correspond to an item of input data 110 may likewise be the targets of classification by the annotators. As such, for ease of description, the term "word" should be understood throughout this disclosure to encompass within its meaning not only a single word of text but also a portion of a word or a group of words, unless otherwise indicated.

The system 200 may further include one or more databases 230 for storing data used for training the NLP model 100. Such data may include a corpus of documents to be annotated for use in training, along with various information related to annotating the documents, such as rules or other parameters to be observed or applied by an annotator making annotations (e.g., a list of possible labels or other classes to be assigned to words in the documents) and data indicative of the annotations made by an annotator (e.g., an annotated class or other annotation data 130 associated with a given word). The documents may broadly encompass any collections of text including text that has been converted by an optical character recognition (OCR) algorithm or by a speech recognition algorithm. Training the NLP model 100 may proceed iteratively as more documents are gathered and more annotations made, with the NLP model 100 being further finetuned at each iteration so that the model output data 120 more closely matches the "correct" annotated classes. Unlike conventional methodologies, innovative aspects of the disclosed system 200 may allow training of the NLP model 100 to meaningfully proceed on the basis of incomplete annotation or other classification data, such as in cases where not all possible classes are considered by the annotator, where not all words are provided with annotated classes, where consensus has not been reached between annotators, and/or where not all classes have been defined.

In general, at each training iteration, the system 200 (e.g., the one or more computers 220 thereof) may evaluate a cross entropy loss function to derive a loss value. In a straight-forward case for a given set of fully annotated data, the cross entropy loss function may simply be a sum that accumulates the cross entropy loss terms for each word or other item of input data, with each cross entropy loss term defining a cross entropy loss between model output data 120 and annotation data 130 of the word, as may be represented by Equation 1, below:

$$\text{loss} = -\sum_{w \in words} \text{loss}_w = -\sum_{w \in words} \log P_{c_w}^w = -\sum_{w \in words} \sum_{i=1}^{c} y_w^i \log P_i^w \quad (1)$$

That is, a total "loss" may be defined as the negative sum of the individual losses $\text{loss}_w$ associated with each word or other item of input data w, with each individual $\text{loss}_w$ being calculated as the log probability of the true class $c_w$ of that word. The negative is used so that the resulting total loss is a positive value, since each log probability will itself be a negative number for probabilities defined between 0 and 1. In the case of model output data 120 and annotation data 130 represented as vectors of length C where C is the number of possible classes (the latter vector being a one-hot encoded indicator vector $y_w^i$), the log probability of the true class $c_w$ may be calculated as the sum over C possible classes (indexed by i) of the indicator vector $y_w^i$ times the model output data logit, log $P_i^w$, as shown in Equation 1. Since a given word may not belong to any of a set of pre-defined classes, it should be noted that in some cases the possible classes may include an "O" class, signifying that the class for the word is "Other," i.e., not one of the pre-defined classes, and the model output data 120 encoding the probability of each class for a given word may likewise include a log($P_O$) component as shown in the example of FIG. 1, representing the model's predicted likelihood that the word does not belong to any of the other classes.

Having evaluated the cross entropy loss function, the system 200 (e.g., the one or more computers 220 thereof) may then adjust the NLP model 100 according to the loss value derived from the cross entropy loss function. The NLP model 100 may typically be adjusted to reduce the loss value derived from the cross entropy loss function and thus reduce the discrepancy between the model's predicted labels and the actual, ground truth labels represented by the annotation data 130. In particular, the NLP model 100 may be adjusted to minimize the loss value, which may be done by calculating the derivative of the cross entropy loss function with respect to one or more parameters of the particular machine learning architecture (such as weights at each layer of a transformer or other neural network) and altering the parameters accordingly. In this regard, it should be noted that the output of the model 100 may be a function of such weights or other parameters (e.g., log P(weights_of_model)), the derivative thus being calculable by application of the chain rule (e.g., backprop using a model training package such as Pytorch or tensor flow that provides stochastic gradient descent solvers). Minimizing the loss value may effectively maximize the probability of the correct class for each word, thus causing the model 100 to put more probability on the correct classes. The procedure may repeat for multiple iterations as more documents are gathered and annotated, until a desired performance of the NLP model 100 is reached or performance saturates.

The requirement of having fully annotated datasets in model training is a major challenge in scaling up training especially when one may want to concentrate on a single class or a few classes that are underperforming. In the iterative process described above, it is possible that performance of individual classes will converge at different rates. In later iterations, having to continually annotate classes that have already converged or already reached a desired level of performance is simply wasted effort that slows down the process for underperforming or more important classes. In large label settings where the number of classes can be in the 100s or 1 k, this represents a prohibitively large annotation burden. Moreover, the mental burden on a human annotator may be significantly reduced if the number of classes is kept low, allowing the annotator to focus on a small task, reducing workload while increasing accuracy and efficiency.

In light of the above considerations, the system 200 shown in FIG. 1 may improve the annotation and training processes by allowing an annotator to consider only a reduced number of classes relative to all possible classes C defined for the problem. That is, instead of requiring every word to be labeled with every potential class, the annotator may instead only be required to label each word with a known subset of all possible classes. As depicted in FIG. 1, for example, an annotator operating an annotator interface 210 may be instructed to consider only the classes "Bird," "Mammal," and "Vehicle" (referenced as "Labels in Consideration" in FIG. 1) out of a larger set of possible classes. The subset of classes under consideration may be determined in various ways, including by assignment to the annotator or in some cases by the annotator's own selection on the annotator interface 210, and may be tailored to the particular expertise of the annotator in question. As the annotator labels words, the annotator may be required only to indicate which, if any, belong to the classes "Bird," "Mammal," and "Vehicle," without any need to consider "Cancer Drug," "Age," or any of the other classes in consideration and without needing to decide whether any of the words should be labeled with the "O" annotation meaning that none of the pre-defined classes are applicable. Any words that do not fall into one of the subset of classes under consideration (namely, "Bird," "Mammal," or "Vehicle") may be so indicated by the annotator using a designated label such as O' (as distinct from O).

Based on the annotator's labeling, the annotation data 130 received by the one or more computers 220 may thus include some annotations indicating an annotated class of a word from among the subset of classes under consideration (namely, the annotations "Mammal" and "Vehicle" in FIG. 1) while also including some annotations indicating that a given word does not belong to any classes from among the subset of classes under consideration (namely, the annotation O'). The one or more computers 220 may store this annotation data 130 in the one or more databases 230 together with class subset data representative of the particular subset of classes under consideration for each word in question (which may generally but need not necessarily remain the same for the duration of a given annotation task). An example of the resulting classification data is shown in FIG. 2, which represents an exemplary portion of the contents of the one or more databases 230. As shown, for each word "The," "brown," etc., the stored classification data may include both the class subset data indicating the subset of classes that was considered by the annotator and annotation data indicating the annotation made (including O' in some cases). In general, the classification data stored in relation to a given word may be understood to be stored in relation to a specific instance of the word in question, e.g., as used in the context of a particular portion of text in a document.

The disclosed system 200 may account for the fact that only a subset of possible classes were considered for some or all of the words by modifying the cross entropy loss function used to train the NLP model 100. In the case of words whose annotation data 130 represents an annotation indicating an annotated class or label of the word from among the subset of classes under consideration (e.g., such as the annotations "Mammal" and "Vehicle" in FIG. 1), the relevant terms of the cross entropy loss function may be the same as defined above in Equation 1. However, if a word was labeled with O', we cannot assume that there is no correct class from among all pre-defined classes since only a subset of classes were considered by the annotator. Therefore, we cannot make use of the O component of the model output data and we cannot evaluate a loss term for this word in the above manner. Instead, a special loss term is introduced to account for any words marked O' as shown in Equation 2, below:

$$loss = -\left( \sum_{w \in words\ with\ label} \log P^w_{c_w} + \sum_{w \in words\ marked\ O'} \log(prob\ word\ as\ O') \right) \quad (2)$$

In particular, the cross entropy loss function may have a first loss term for each item of the model input data 110 that is associated with a word whose annotation data 130 represents an annotation indicating an annotated class of the word from among the subset of classes under consideration. As described above, the first loss term may define a cross entropy loss between model output data 120 representative of the model's predicted class membership of the word and the annotation data 130 of the word, except in this case the first loss term may only be defined for input data 110 with an annotated class (e.g., words with a label). Meanwhile, the cross entropy loss function may have a second loss term for each item of the model input data 110 that is associated with a word whose annotation data 130 represents an annotation indicating that the word does not belong to any class from among the subset of classes under consideration, namely, those words marked with O'. The second loss term may define a probability (e.g., a log probability) of the model's predicted class membership of the word not being among the subset of classes under consideration. This second loss term, identified as log(prob word as O') in Equation 2, may be computed with reference to the class subset data stored for each word, as shown in Equation 3, below:

$$loss = -\left( \sum_{w \in words\ with\ label} \log P^w_{c_w} + \right. \quad (3)$$

-continued $$\left. \sum_{w \in words\ marked\ O'} \log\left( 1 - \sum_{i \in label\ subset\ for\ w} P^w_i \right) \right)$$

As shown, for each class in the subset of classes under consideration for a given word, a normalized probability $P^w_i$ that the NLP model 100 assigns that class to the word may be determined and these normalized probabilities $P^w_i$ may be summed. One minus this sum may then be thought of as the normalized probability of the model's predicted class membership of the word not being among the subset of classes under consideration. The log probability of the result may serve as the special loss term defined for each word marked O'. It is noted that the normalized probabilities $P^w_i$ may be computed from the typically unnormalized output data 120 using an exponential function (e.g., by applying a softmax function to the logit output of the NLP model 100).

By modifying the cross entropy function to accommodate incomplete classification data derived from consideration of only some but not all of the pre-defined classes, it becomes possible for annotators to refer to arbitrary subsets of classes when annotating documents. The annotation workload can be arranged so that different annotators work on different subsets of labels or only annotate labels of high value, or the annotator interface 210 may allow the annotator to select labels that he/she determines are needed for a particular task. In each case, the annotator only needs to focus on a relatively small task, keeping the workload low and reducing the mental burden. The resulting different sets of annotation data may then be integrated together using a loss function such as described above.

In some cases, the same technique may be applied in order to make use of labeled datasets that have overlapping but not identical labels. In such a case, one may want to simply put these datasets together and train the model 100 using the full merged dataset. But since model training conventionally requires all labels to be present on each sample, merging different datasets with overlapping but not identical labels would conventionally require additional annotation effort. By instead defining a different class subset for each set of annotation data 130 that uses nonidentical labels, all of the annotation data 130 may be used to train the model 100 as described above without requiring additional annotation.

Referring again to FIG. 2, it should be noted that the class subset data for some words (e.g., "word1," "word2," and "word3") may indicate only a single class (e.g., "person name"). In other words, the annotator in these instances was tasked only with deciding whether or not each word should be labeled as "person name." In the case of "word1," the annotator decided that, yes, the label "person name" was appropriate, while in the case of "word2" and "word3," the annotator decided that, no, the label "person name" was not appropriate. Having only a single class to consider represents a special case of the example shown in FIG. 1 in which a subset of classes is considered. When the subset of classes contains only one class, the annotator need only consider a single class, rapidly deciding presence or absence of the class (i.e., "Yes" or "No") for each word to be annotated. This type of annotating strategy may be useful, for example, if after a few rounds of training the performance of a particular class needs to be improved by adding more documents or other data samples. Because the annotator only has to consider the single class, he/she is able to annotate very quickly and accurately, labeling each word as "Yes" (i.e., "person name") or "No" (i.e., O').

When it comes to defining the cross entropy loss function to accommodate the use of class subsets as demonstrated above in Equations 2 and 3, the loss term for any O'-labeled word whose class subset data indicates only a single class may be further simplified, as shown in Equation 4 below:

$$loss_w = \log\left(1 - \sum_{i \in label\ subset\ for\ w} P_i^w\right) = not\_c_w = \log(1 - P_c^w) \qquad (4)$$

That is, for any O'-labeled word based on a single class under consideration, a normalized probability $P_c^w$ that the NLP model 100 assigns the specified class to the word may be determined. One minus this probability may therefore be understood to be the normalized probability of the model's predicted class membership of the word not belonging to the specified class. The logarithm of the result (i.e., the corresponding log probability) may serve as the special loss term for the word.

FIG. 2 also includes example entries of classification data for "word4" and "word5," for which the class subset data indicates that all pre-defined classes were considered. In such instances, the class "O" may be used by the annotator to indicate that none of the classes are applicable to a given word as described above. This is illustrated in the case of "word5," for which the annotation data indicates "O" in FIG. 2. It should be noted that such O-labeled words do not implicate the special loss terms described above, as the class "O" may simply be treated as any other class and should not be confused with the O' indicator. As such, the O-labeled word may be regarded as belonging to the "words with label" category in Equations 2 and 3. The O component of the model output data 120 may be used to evaluate the loss term for the word in the ordinary fashion in accordance with Equation 1.

Figure 3:
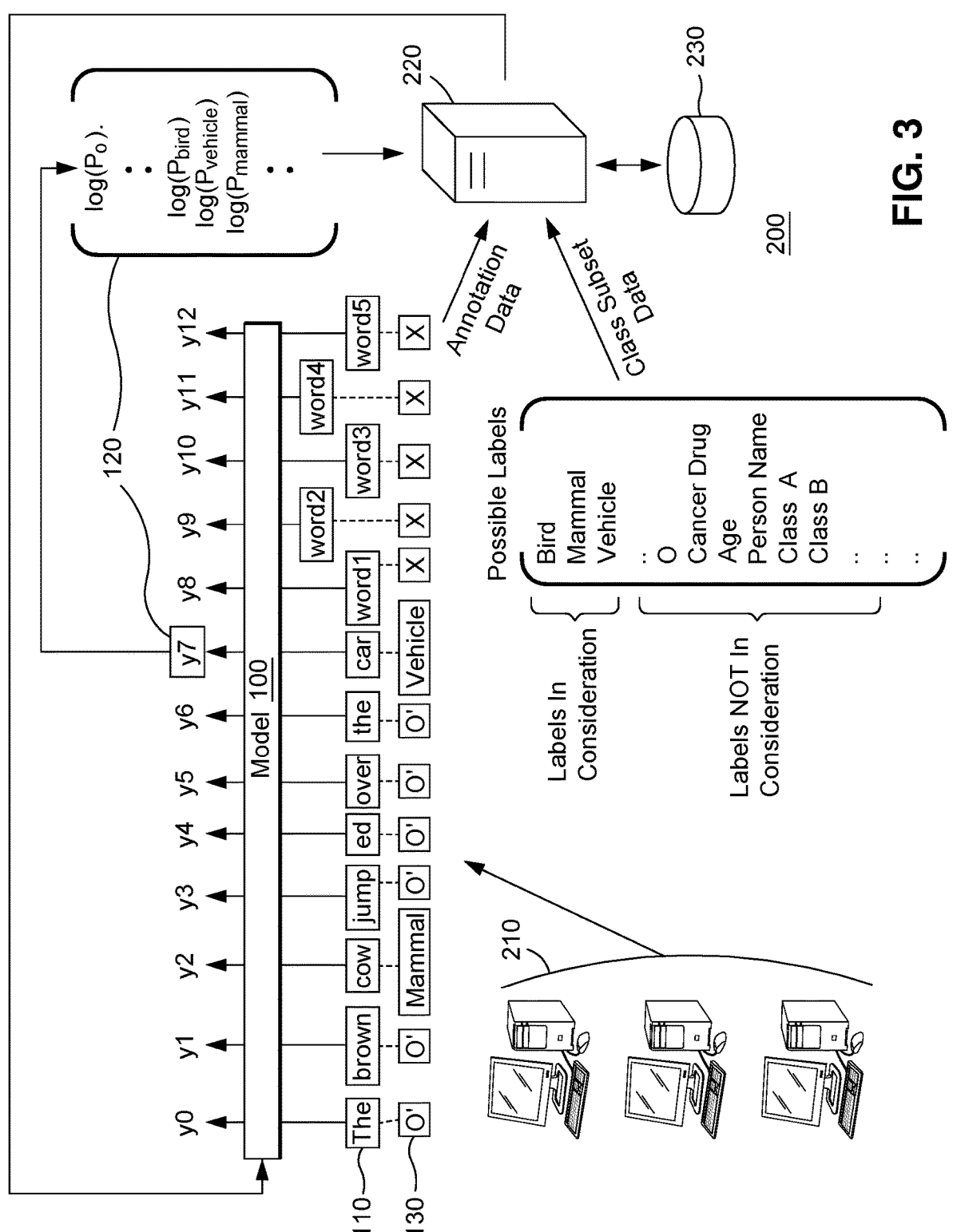
FIG. 3 is another view of the NLP model and system.

FIG. 3 is another view of the NLP model 100 and system 200, illustrating an aspect of the system 200 that allows for model training to proceed despite less than all of the words in a given set of training data being annotated. FIG. 3 is equivalent to FIG. 1 except that additional model input data 110 and output data 120 is shown, along with additional annotation data 130. In particular, new items of input data 110 corresponding to "word1," "word2," "word3," "word4," and "word5" are illustrated, with corresponding output data 120 identified as y8, y9, y10, y11, and y12, respectively. For each of these words, the annotator has assigned the special annotation "X" indicating that the word is not to be classified by the model 100. Correspondingly, as shown in FIG. 4, which shows further example contents of the one or more databases 230, the stored classification data may reflect annotation data 130 of "X" for each of these items of input data 110.

In annotation tasks, there may often be large sections of a page of a document that may not provide meaningful information to the model 100 and may be difficult to annotate but that may still be important context for the model 100 (and thus should not be removed from the document). As an example, there may be the main substantive text of a document as well as contextual text in headers and footers, such as corporate information in the footer of a webpage. The model 100 may have no capacity to distinguish between these portions of the document and may simply take in the entire text or text fragment as input. If the non-substantive portion were to be entirely removed from the data sample, the additional contextual information provided would be lost. While it may be unnecessary for the model 100 to classify the words of the non-substantive portion, the contextual information it provides could very well be useful to the model in classifying words of the substantive portion. In such a circumstance, or in any other circumstance where the annotator decides that the model 100 does not need to classify some part of the text, the annotator may designate a "don't care" word or region of words using the "X" annotation (or by leaving it blank, which may mark "X" by default). Advantageously, the system 200 may account for such irrelevant text by assigning corresponding loss terms with reduced (e.g., zero) weight as shown, for example, in the modified cross entropy loss function of Equation 5, below:

$$loss = - \sum_{w \in words} weight_w * loss_w \qquad (5)$$

In particular, the cross entropy loss function may define, for each item of the model input data 110 (e.g., for each word w), a weighted cross entropy loss between model output data 120 representative of the model's predicted class membership of the word and the annotation data 130 of the word. The weighted cross entropy loss for the given item of model input data 110 may be the same as the cross entropy loss described above, for example, as shown in Equation 1, except that less weight may be given to the cross entropy loss for a word whose annotation indicates that the word is not to be classified by the model (e.g., marked "X"). This may be achieved through the use of a weight coefficient "weight_w" as shown in Equation 5, which may have a smaller value for X-marked words (e.g., $weight_w=0$) than for words whose annotation indicates an annotated class (e.g., $weight_w=1$). In this way, the loss terms corresponding to irrelevant text will not contribute (or will not as substantially contribute) to the total loss even though the whole text is still ingested by the model 100. Thus, the model 100 may make use of the full context of the document without the annotator being required to mark every word.

Figure 5:
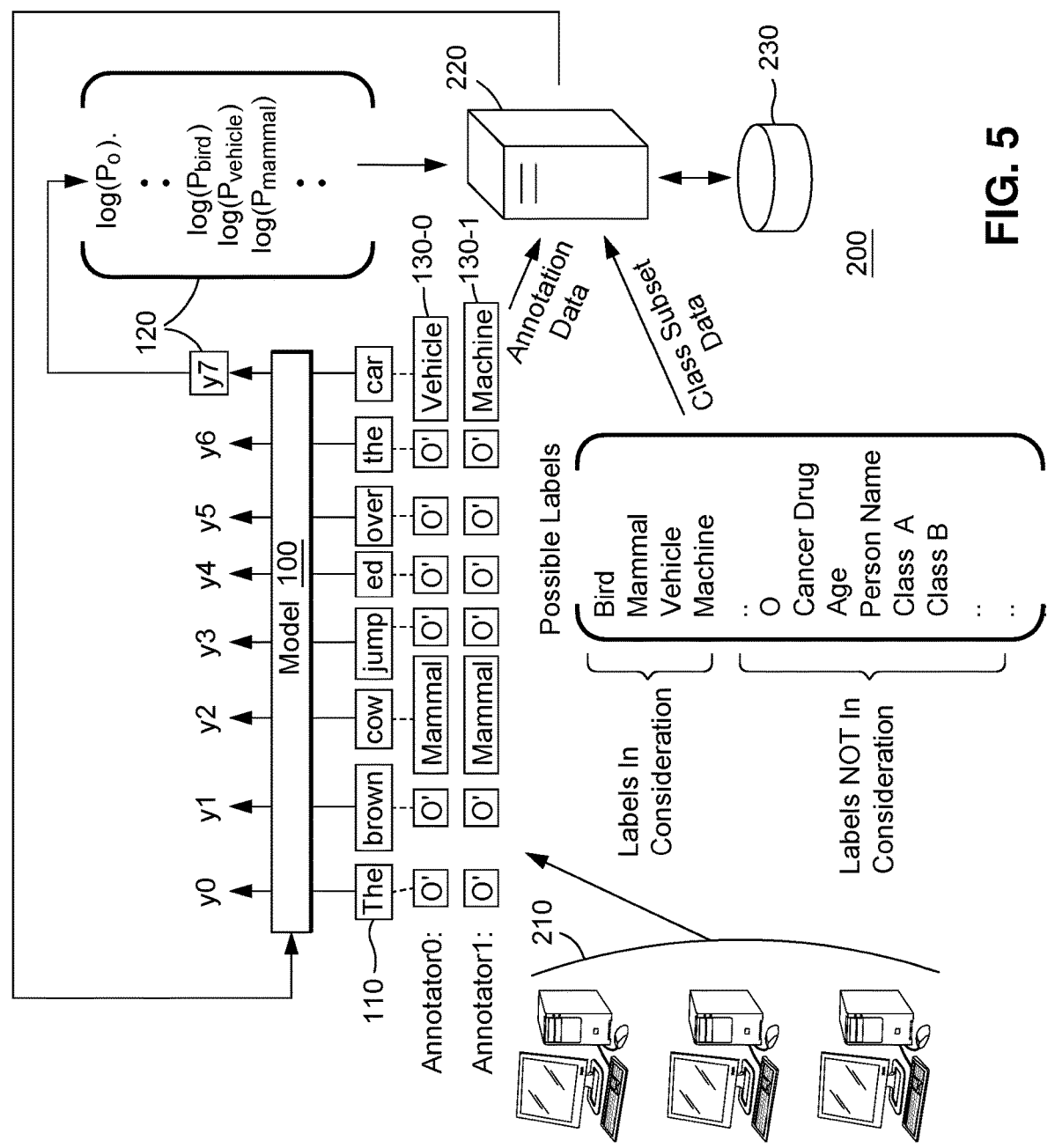
FIG. 5 is another view of the NLP model and system.

FIG. 5 is another view of the NLP model 100 and system 200, illustrating an aspect of the system 200 that allows for model training to proceed despite consensus having not been reached between annotators. FIG. 5 is substantially equivalent to FIG. 1 except that the annotations of two different annotators (e.g., using two annotator interfaces 210) are shown, represented by the two rows of annotation data 130, labeled 130-0 and 130-1, corresponding to Annotator0 and Annotator1, respectively. The annotations match except that the annotated class for the word "car" was found to be "Vehicle" by Annotator0 and "Machine" by Annotator1, creating an ambiguity. Correspondingly, as shown in FIG. 6, which shows further example contents of the one or more databases 230, the stored classification data may reflect both the annotation data 130-0 and the annotation data 130-1 for this item of input data 110 (indicated as "vehicle, machine" for the word "car").

In general, there may be cases where it is not clear which label an individual word should be given, or the correct label may for some other reason depend on the annotator, resulting in two or more different annotated classes for a single word. In the illustrated example, Annotator0 has labeled the word "car" as having class "Vehicle," while Annotator1 has labeled the same word as having class "Machine." One solution to this discrepancy is to attempt to resolve the ambiguity prior to using the annotation data 130 to train the model 100, for example, by consulting both annotators to come to an agreement, adding an additional annotator or annotators and selecting the class that most frequently is selected, or altering the class labels so they are less ambiguous. However, these approaches suffer from several drawbacks, most notably that they all require time-consuming corrective measures that increase the annotation burden and reduce the efficiency of the process.

Aspects of the disclosed system 200 may solve the problem of a lack of consensus by modifying the definition of loss (and, in particular, the cross entropy loss function) to account for words whose annotation data 130-0, 130-1 includes multiple annotated classes. As illustrated in FIGS. 5 and 6, the stored annotation data 130-1, 130-2 of at least one of the plurality of words (e.g., "car") may be representative of two or more annotations indicating different annotated classes of the word (e.g., "Vehicle" and "Machine"). The loss term $loss_w$ for such a word having multiple annotated classes may be extended as shown in Equation 6, below:

$$loss_w = \log\left(\sum_{c \in assigned\ labels} P_c^2\right) \quad (6)$$

The above loss term may serve as $loss_w$ in Equation 1, for example, for any word having multiple annotated classes. In place of the log probability of the true class $c_w$ of that word (there being no single true class $c_w$), a normalized probability $P_c^w$ that the NLP model 100 assigns the class c to the word may be determined for each class c among the assigned labels, i.e., for each different annotated class represented by the annotation data 130-0, 130-1 for the word. The normalized probabilities $P_c^w$ may be summed, resulting in a quantity that may be thought of as the normalized probability of the model's predicted class membership of the word being among the different annotated classes. The logarithm of the result (i.e., the corresponding log probability) may serve as the special loss term defined for any such word having multiple annotated classes. Essentially, the system 200 may accumulate the probability mass of each annotated class into the loss term. In this way, the system 200 may combine different information from different annotators directly when training the model 100, without needing to take any corrective measures in the case of ambiguous annotations. As above, it is noted that the normalized probabilities $P_c^w$ may be computed from the typically unnormalized output data 120 using an exponential function (e.g., by applying a softmax function to the logit output of the NLP model 100).

Figure 7:
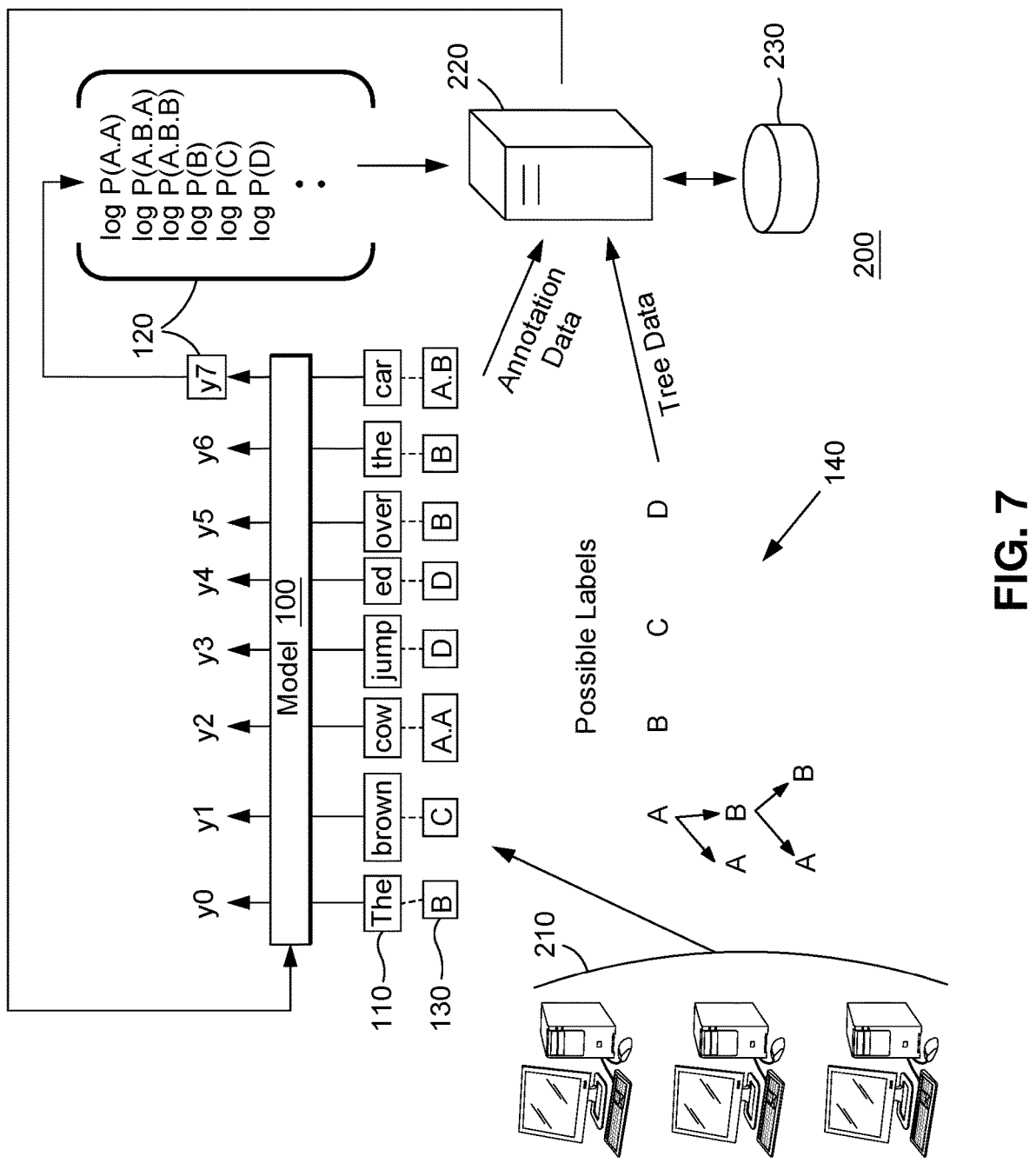
FIG. 7 is another view of the NLP model and system.

FIG. 7 is another view of the NLP model 100 and system 200, illustrating an aspect of the system 200 that allows for model training to proceed despite not all classes having been defined. FIG. 7 is substantially equivalent to FIG. 1 except that the list of possible labels or other classes is presented in a hierarchical tree structure 140 and the annotations represented by the annotation data 130 (and correspondingly in the example logits of the output data 120) are abstracted for simplicity in illustrating the use of the tree structure 140. Each class may be defined according to the hierarchical tree structure 140, such that the eight possible classes in the illustrated example are as follows (using dot notation to demarcate tree levels): A, A.A. A.B. A.B.A, A.B.B, B, C, and D. Of these eight classes, only six classes are childless: A.A. A.B.A. A.B.B, B, C, and D. Childless classes may represent the set of fully defined classes that may be predicted for a given word by the model 100, as reflected in the example output data 120. Classes A and A.B, which are not childless, may thus be regarded as ancestor classes to one or more other classes. Specifically, class A may be considered an ancestor class to classes A.A. A.B. A.B.A, and A.B.B, among which classes A.A. A.B.A. and A.B.B are childless. Class A.B may be considered an ancestor class to classes A.B.A and A.B.B. both of which are childless. Tree data representing the hierarchical tree structure 140 may be stored by the one or more computers 220 in the one or more databases 230 as part of the classification data, as shown in FIG. 8, which shows further example contents of the one or more databases 230.

As noted, the annotations in FIG. 7 are abstracted for simplicity (so that the drawing is not crowded with text), but these classes may stand for any kinds of labels or other classes. Referring back to the example classes in FIG. 1, it might be supposed that classes A.A and A.B are the "Mammal" and "Vehicle" classes, respectively. In this case, the parent class A in the hierarchical tree structure 140 might be something like "Thing," and the child classes A.B.A and A.B.B might "Airplane" and "Car," for example. An annotator using an annotator interface 210 might refer to the hierarchical tree structure 140 (but more likely showing the classes themselves rather than abstracted letters) or might refer to a simple list (as in FIG. 1), with the hierarchical tree structure 140 being hidden but nevertheless understood by the system 200 (and, for example, stored in the one or more databases 230). It should also be recognized that an annotator might only be tasked with annotating using a subset of the classes as described in relation to FIG. 1. In this regard, it is noted that the class subset data is omitted from FIGS. 7 and 8 merely for simplicity of illustration.

From an organizational perspective, the basic use of a hierarchical tree structure 140 to organize classes is readily apparent. In general, after a large set of data is annotated, it might be discovered that further refinement of the classes is needed. For example, for initial annotation tasks, a label such as "Living Thing" may be one of the classes, but it may later be discovered that both plants and animals need to be separately considered. The "Living Thing" class might thus be made into an ancestor class whose child classes are a "Plant" class and an "Animal" class. As another example, model training might begin with a tag like "Cancer Diagnosis" as a class, but it might be discovered that more detail is desired within that category in order to distinguish between different cancer types or cancer locations, for example. By organizing a set of classes according to a hierarchical tree structure 140, an existing set of classes can be extended in a straightforward fashion.

In a simplistic application of such a hierarchical tree structure 140, the various annotations B. A.A, etc. may be handled exactly like the other classes described herein, with the available classes for annotation being only the childless classes and the ancestor classes being only for organizational purposes. As an annotator assigns classes to words, the system 200 may record the annotation data 130 with reference to the hierarchical tree structure 140 (e.g., in dot notation). For example, if an annotator assigns "Animal" to a word, the annotation data 130 for such a word might be interpreted as "LivingThing.Animal" in accordance with the hierarchical tree structure 140. In some cases, a level of the hierarchical tree structure 140 might have a catchall "Other" class. For example, an annotator's labeling of "Grass" might be understood by the system 200 as "LivingThing.Plant.Other.Grass" in a case where the child classes of the "Plant" class only include "Flower," "Tree," and "Other." In this simplistic application, if it is desired that a label category be refined, it is always possible to add additional leaves and branches to the tree. However, when doing so, it would become necessary to go back and reapply the new class(es) to all data samples that were previously labeled with the old leaf, which has now become an ancestor class. For example, if a large data set has already been labeled with the class "LivingThing" and the child class "Animal" is later added to the hierarchical tree structure 140, it becomes necessary to go back and reconsider everything labeled "LivingThing" to decide whether "LivingThing.Animal" is appropriate. This could be prohibitively expensive, especially where multiple child classes are added, such as "LivingThing.Animal," "LivingThing.Plant," and "LivingThing.Other."

Instead of the above simplistic approach, the disclosed system 200 advantageously may make use of the hierarchical tree structure 140 in a way that anticipates and accounts for the addition of leaves and branches to the hierarchy. In particular, as an annotator labels words using classes from the hierarchical tree structure 140, the system may interpret the annotated class of the annotation data 130 as automatically implying that the annotated class may be any current or future child class (or grandchild class or any descendent class) according to the hierarchical tree structure 140. As the hierarchical tree structure 140 is updated, the already-stored annotation data 130 automatically takes on a new meaning in accordance with the new hierarchical tree structure 140 and thus does not need to be updated. In principle, the annotated class may represent something more like a label prefix rather than an explicit label for a word, such that any child class sharing that same label prefix may be implied by the annotation. For example, if the word "cow" is labeled "LivingThing" (represented by "A" in the example of FIG. 7), the system 200 may understand the annotated class as being any of the descendant classes of "LivingThing," including "LivngThing.Animal," "LivingThing.Plant-.Flower," etc., with the relevant set of descendant classes potentially changing over time as the hierarchical tree structure 140 is revised. With this understanding, the loss term $loss_w$ for a given word or other item of input data w may be extended to account for the hierarchical tree structure 140 as shown in Equation 7, below:

$$loss_w = \log\left(\sum_{each\ c\ that\ has\ prefix\ label} P_c^w\right) \quad (7)$$

The above loss term may serve as $loss_w$ in Equation 1, for example, for each word whose annotation data 130 represents an ancestor class, e.g., a class that might have been a childless class at the time the annotator made the annotation but that has since become an ancestor class due to changes in the hierarchical tree structure 140. A normalized probability $P_c^w$ that the NLP model 100 assigns the class c to the word may be determined for each class c among the childless classes that are descendants of the ancestor class in question, that is, for each childless class that includes the annotated class as a label prefix. The normalized probabilities $P_c^w$ may be summed, resulting in a quantity that may be thought of as the normalized probability of the model's predicted class membership of the word being among the at least one childless classes descended from the annotated class (i.e., falling within the annotated class when viewed as a category). For example, as represented in FIG. 8, the annotation data 130 for "car" may be A.B, resulting in a loss term summing over childless classes A.B.A and A.B.B in accordance with the stored tree data. The logarithm of the result (i.e., the corresponding log probability) may serve as the special loss term defined for any such word having an ancestor class as its annotated class. It may also be noted that the above loss term reduces to the standard loss term of Equation 1 when applied to childless classes themselves (since in the case of a childless class there are by definition no other classes having the same class as a label prefix). Therefore, the above special loss term may in some cases be applied universally to any input data 110 classified using the hierarchical tree structure 140, without regard to whether or not the annotated class in question is an ancestor class. Lastly, it is again noted that the normalized probabilities $P_c^w$ may be computed from the typically unnormalized output data 120 using an exponential function (e.g., by applying a softmax function to the logit output of the NLP model 100).

As can be appreciated, by virtue of the above-described special loss term, it may be possible to make use of previously labeled data in conjunction with newly annotated data (using new classes added to the hierarchical class structure 140) without having to change the old data. Labeling data in a hierarchal manner may also have performance benefits as it allows for explicit grouping strategies when labeling data. For example, if one wants to extract and classify date of birth and encounter date in health records, the use of a hierarchical class structure 140 allows for organizing them as Word.Date.DOB, Word.Date.Encounter-Date, and Word.Date.Other, which may be more performant then only labeling them non-hierarchically as DOB or EncounterDate. This is because the annotator(s) can first focus on the simpler task of labeling Word.Date so that the model 100 can be informed about dates in general. Then, in a second step, the annotator(s) can work on the more challenging task of labeling Word.Date.DOB and Word.Date.EncounterDate. Using hierarchal constraints as described, it is noted that there is no need for the annotators to explicitly refer to the "Other" label, Word. Date. Other (i.e., some other type of date), since this will be inferred by virtue of the use of the Word. Date class in the sense of a label prefix as described above and as incorporated into the example loss term of Equation 7. In addition to allowing for better balancing of the annotation workload, training the model 100 first using Word.Date and subsequently using specific date classes may allow the model 100 to quickly understand dates in general and then thereafter infer amongst dates, which empirically has shown to generalize better than just labeling the leaf labels (i.e., the childless classes) directly. In this way, the model 100 may beneficially be trained at different stages of developing the hierarchical tree structure 140 for improved performance.

Figure 9:
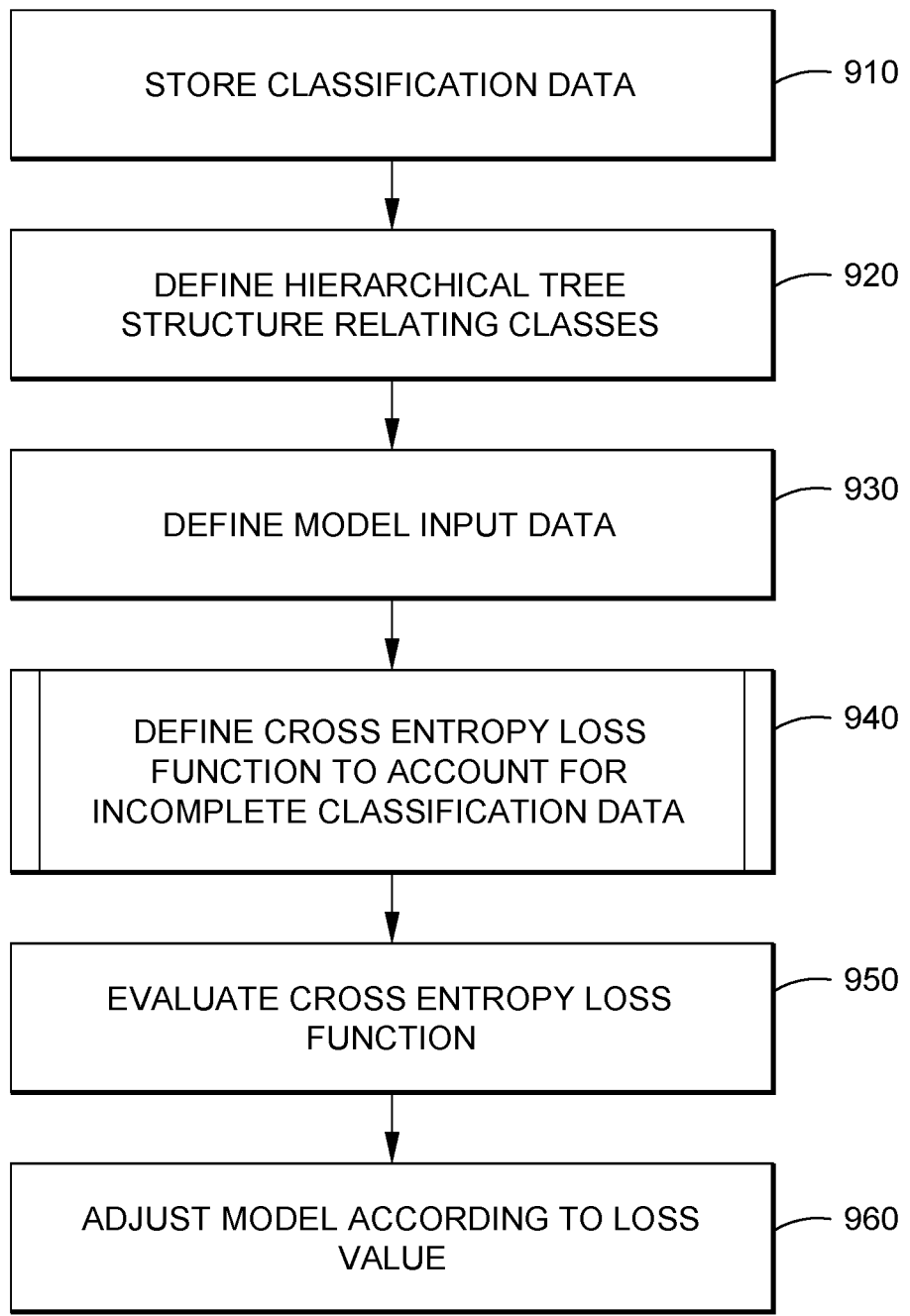
FIG. 9 shows an example operational flow in accordance with various embodiments of the disclosed subject matter.

FIG. 9 shows an example operational flow in accordance with various embodiments of the disclosed subject matter. The operational flow may be performed by the system 200 shown and described in relation to FIGS. 1-8 and may, for example, represent processing steps performed by one or more computers 220 of the system 200. While the model training processes described herein may be iterative and/or cyclical in nature, for simplicity the operational flow may be thought of as beginning with storing various classification data (step 910). For example, the one or more computers 220 may store classification data in one or more databases 230, a portion of which may be exemplified by the data structures shown in FIGS. 2, 4, 6, and 8, which are illustrated in tabular form to represent how the data may be organized or indexed. As noted above, the classification data may, in general, include a corpus of documents to be annotated for use in training as well as various information related to annotating the documents such as a list of possible labels or other classes. As pertains particularly to the aspects of the system 200 described in detail herein, the classification data may include annotation data 130 that may be representative of an annotation of a given word, which may indicate an annotated class of the word (or sometimes more than one annotated class as in FIGS. 5 and 6), that the word does not belong to any class from among a subset of classes under consideration (O' in FIGS. 1 and 2), or that the word is not to be classified by the model (X in FIGS. 3 and 4), for example. The classification data may additionally include class subset data representative of a subset of classes under consideration for a given word and/or tree data representative of a hierarchical tree structure 140 relating the labels or other classes (see FIGS. 7 and 8). It is noted that any and all of these various types of classification data, while described separately for ease of understanding, may be combined and used by the same system 200 to train the model 100. For example, annotators may be presented with annotation tasks that allow them to select (or are otherwise assigned) a portion of a hierarchical tree 140 as a subset of classes for annotating one or more words of a document, and the annotators may be instructed to use an O' annotation for classes falling outside the subset and an X annotation for words not to be classified by the model 100 (e.g., "don't care" regions of text). The class subset data, tree data, and annotation data 130 (which may differ between different annotators) may all be stored as classification data in the one or more databases 230.

As described above, one of the benefits of the use of a hierarchical tree structure 140 in accordance with the disclosed embodiments is that the system 200 may account for the addition of new classes to the hierarchical tree structure 140 when training the model 100, without having to discard or modify already-accumulated annotation data 130. In this respect, in a case where a hierarchical tree structure 140 is used to organize the classes as described in relation to FIGS. 7 and 8, the operational flow of FIG. 9 may thus proceed with defining (e.g., redefining) the hierarchical tree structure 140 (step 920) following the accumulation of the annotation data 130 and other classification data in step 910. It should be understood, however, that the same or an earlier version of the hierarchical tree structure 140 may be defined and stored at an earlier time (e.g., as part of step 910). The hierarchical tree structure 140 may be defined and stored by the one or more computers 220 in the one or more databases 230, for example (and may be stored as classification data as shown in FIG. 8).

The operational flow may additionally include defining model input data 110 associated with each of the words that will be used to train the model 100, namely, the same words for which annotation data 130 has been generated and stored. For example, the one or more computers 220 may map each of a plurality of words to a respective vector so that it may be ingested by the model 100 and used to generate output data 120 by the application of various mathematical operations that transform the vector. The vectors may be fixed dimensional real-valued vectors, for example, and the mapping may be via table lookup. The relevant words to be mapped to vectors may be determined by a tokenization algorithm, for example (e.g., using spaces between words, punctuation, and/or known prefixes and suffixes to divide the text as desired).

Figure 10:
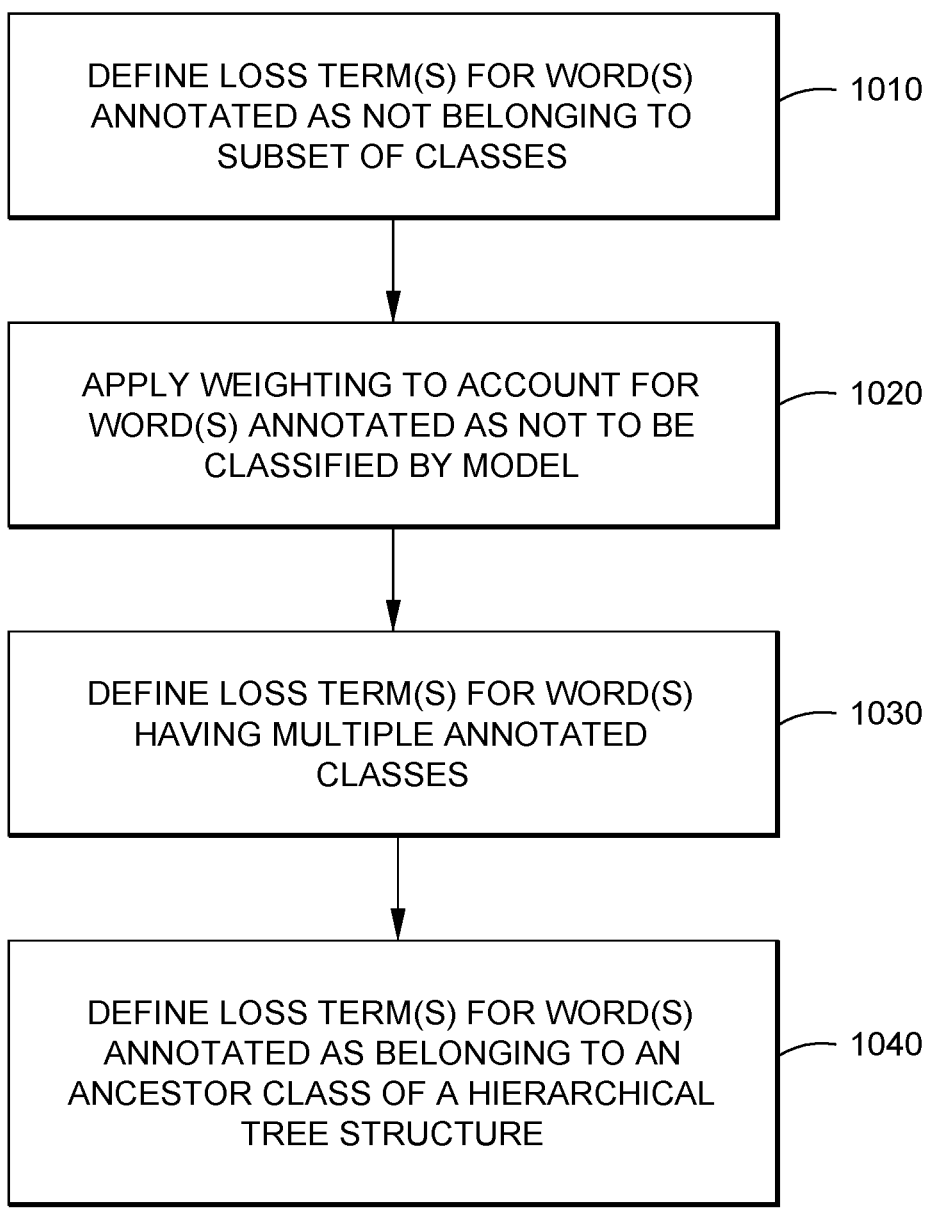
FIG. 10 shows an example sub-operational flow of step 940 in FIG. 9.

Depending on which of the several aspects of the system 200 described herein is to be applied, the operational flow may proceed with defining a cross entropy loss function to account for various types of incomplete classification data (step 940). In this regard, FIG. 10 shows an example sub-operational flow of step 940, in which various optional steps are shown corresponding to the several aspects described herein. In no particular order, the sub-operational flow of step 940 may include defining loss term(s) for word(s) that have been annotated as not belonging to a specified subset of classes under consideration, such as by the annotation O' (step 1010). Such loss term(s) are described in relation to FIGS. 1 and 2 and may take the form of Equations 2, 3, and 4, for example. The sub-operational flow may further include applying weighting to account for word(s) that have been annotated as not to be classified by the model 100, such as by the annotation X (step 1020). Weighting is described in relation to FIGS. 3 and 4 and may take the form of Equation 5, for example. The sub-operational flow may further include defining loss term(s) for any word(s) having multiple annotated classes that are consistent with each other, such as annotations 130-0 and 130-1 made by Annotator0 and Annotator 1 (step 1030). Such loss term(s) are described in relation to FIGS. 5 and 6 and may take the form of Equation 6, for example. The sub-operational flow may further include defining loss term(s) for word(s) that have been annotated as belonging to an ancestor class of a hierarchical tree structure 140, such as class A.B in FIGS. 7 and 8 (step 1040). Such loss term(s) are described in relation to FIGS. 7 and 8 and may take the form of Equation 7, for example. The cross entropy loss function defined in step 940 of FIG. 9 may combine any such special loss terms and weighting with standard loss terms of the form of Equation 1, for example. In this way, the cross entropy loss function may account for incomplete classification data including where not all possible classes are considered by the annotator (e.g., by step 1010), where not all words are provided with annotated classes (e.g., by step 1020), where consensus has not been reached between annotators (e.g., by step 1030), and/or where not all classes were defined at the time of annotation (e.g., by step 1040).

Referring back to FIG. 9, the operational flow may continue with evaluating the cross entropy loss function (step 950) and adjusting the model 100 accordingly (step 960) as described above. As explained, the training process may be iterative. In this respect, the entire operational flow of FIG. 9 may repeat, beginning with collecting new documents or other training data and storing it, together with new annotation data 130 etc. in step 910. If no changes are made to the classes or if no hierarchical tree structure 140 is used, step 920 may be skipped. Alternatively, it may be that new potential areas of distinction are revealed by the previous iteration, in which case more classes may be added to a hierarchical tree structure 140 in step 920. The remainder of steps 930-960 may proceed as in previous iterations. As another example, there may be cases where no new documents are collected, for example, where a new iteration is undertaken only to tweak the hierarchical tree structure 140 (e.g., to account for a new distinction between classes). In this case, the operational flow of FIG. 9 may repeat beginning with step 920 and then proceeding directly to steps 940-960 based on the modified loss terms taking into account the revised hierarchical tree structure 140 in substep 1040 of step 940.

Throughout the above, the disclosed subject matter is described in relation to the training of an NLP model as one practical example. However, the disclosed subject matter is not necessarily limited in this respect and may apply to the training of other types of models in other areas of machine learning that make use of classification loss terms. Within the context of computer vision, for example, this may include tasks such as image classification, object detection, and semantic segmentation. The same techniques described herein may be applied, with the only difference being the replacement of the described words (e.g., "The brown cow jumped over the car") with image data and the classification terms of these respective problems replaced with what is described here. The machine vision model may, in general, interpret input data (e.g., one or more features representative of an image, a portion of an image, or a set of images) to produce output data representative of the model's predicted class consistent with the task at hand. For example, in the context of image classification, a class may indicate what (or who) the image is a picture of, for example. Annotations may be made by annotators to produce training images associated with known classes, with the classification data being stored and used to formulate modified cross entropy loss functions according to the techniques described above. Similarly, for semantic segmentation, the techniques described herein may be applied at the pixel level (i.e., a label like "grass" or "sky" per pixel). For the case of object detection, the techniques may apply to the classification labels (i.e., the labels of boxes) and related loss terms in such systems (e.g., the box localization and other terms would remain).

The various functionality and processes described in relation to the system 200 of FIGS. 1-8 and the operational flows of FIGS. 9 and 10, as well as in some cases the NLP model 100 itself, may, in whole or in part, be embodied in a computer program product that may reside within or otherwise communicate with the annotator interface(s) 210, computer(s) 220, and/or database(s) 230 of the system 200. The computer program product may comprise one or more non-transitory program storage media (e.g., hard drive, FPGA, PLA, solid state drive, RAM, flash, ROM, etc.), that store computer programs or other instructions executable by one or more processors (e.g., a CPU or GPU) or programmable circuits to perform operations in accordance with the various embodiments of the present disclosure. The one or more non-transitory program storage media may in some cases reside external to the annotator interface(s) 210, computer(s) 220, and/or database(s) 230 of the system 200 such as in a cloud infrastructure (e.g., Amazon Web Services, Azure by Microsoft, Google Cloud, etc.) and/or a server system accessible via a network such as the Internet, with the computer programs or other instructions being provided to the annotator interface(s) 210, computer(s) 220, and/or database(s) 230 over the network. Examples of program instructions stored on a computer-readable medium may include, in addition to code executable by a processor, state information for execution by programmable circuitry such as a field-programmable gate arrays (FPGA) or programmable logic array (PLA).

It should be noted that any computer described herein may include any suitable combination of computing devices, including servers, interfaces, systems, databases, agents, peers, engines, controllers, modules, or other types of computing devices operating individually or collectively. One should appreciate that any such computing device may comprise a processor configured to execute software instructions stored on a tangible, non-transitory computer readable storage medium such as those described above, and that the software instructions may configure the computing device to provide the roles, responsibilities, or other functionality as discussed above with respect to the disclosed subject matter. A system controller may comprise at least a computer-readable non-transient memory, a processor, and computer code saved on the memory with instructions that, when executed by the processor, perform functions. Any suitable computer-readable non-transient memory that allows software instructions to be saved or allows firmware to be flashed could be used, for example a hard disk, a solid state drive, ROM, a programmable EEPROM chip. In some embodiments, the various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges may be conducted over a packet-switched network, the Internet, LAN, WAN, VPN, or other type of packet switched network a circuit switched network, cell switched network, or other type of network. As used herein, when a system, engine, server, device, module, or other computing element is described as configured to perform or execute functions on data in a memory, the meaning of "configured to" or "programmed to" may refer to one or more processors or cores of the computing element being programmed by a set of software instructions stored in the memory of the computing element to execute the set of functions on target data or data objects stored in the memory.

The subject matter described herein is considered to include all possible combinations of the disclosed elements. Thus, if one disclosed example comprises elements A, B, and C, and a second example comprises elements B and D, then the subject matter described herein is also considered to include other remaining combinations of A, B, C, or D, even if not explicitly disclosed. As used in the description herein and throughout the claims that follow, the meaning of "a," "an," and "the" includes plural reference unless the context clearly dictates otherwise. All methods, processes, and operational flows described herein can be performed in any suitable order unless otherwise indicated herein or otherwise clearly contradicted by context. The use of any and all examples, or exemplary language (e.g., "such as") provided with respect to certain embodiments herein is intended merely to better illuminate the subject matter described herein and does not pose a limitation on the scope of the subject matter described herein unless claimed otherwise. No language in the specification should be construed as indicating any non-claimed element essential to the practice of the subject matter described herein. Groupings of alternative elements or embodiments of the subject matter described herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprise," "comprises," and "comprising," as well as the terms "include," "includes," and "including," should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the subject matter disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of training a natural language processing (NLP) model, the method comprising:

storing classification data associated with a plurality of words, the classification data including, for each of the plurality of words, class subset data representative of a subset of classes under consideration for the word and annotation data representative of an annotation of the word, the annotation of at least one of the plurality of words indicating an annotated class of the word from among the subset of classes under consideration, the annotation of another at least one of the plurality of words indicating that the word does not belong to any class from among the subset of classes under consideration;

defining model input data associated with each of the plurality of words;

evaluating a cross entropy loss function to derive a loss value, the cross entropy loss function having a first loss term for each item of the model input data that is associated with a word whose annotation data represents an annotation indicating an annotated class of the word from among the subset of classes under consideration, the cross entropy loss function having a second loss term for each item of the model input data that is associated with a word whose annotation data represents an annotation indicating that the word does not belong to any class from among the subset of classes under consideration, the first loss term defining a cross entropy loss between model output data representative of the NLP model's predicted class membership of the word and the annotation data of the word, the second loss term defining a probability of the NLP model's predicted class membership of the word not being among the subset of classes under consideration; and adjusting the NLP model according to the loss value derived from the cross entropy loss function.

2. The model of claim 1, wherein said adjusting includes adjusting the NLP model to reduce the loss value derived from the cross entropy loss function.

3. The model of claim 1, wherein said adjusting includes minimizing the loss value derived from the cross entropy loss function.

4. The method of claim 1, wherein, for each of the at least one of the plurality of words whose annotation data represents an annotation indicating an annotated class of the word, the first loss term includes a negative log probability of the NLP model's predicted class membership being the annotated class.

5. The method of claim 1, wherein, for each of the at least one of the plurality of words whose annotation data represents an annotation indicating an annotated class of the word, the annotation data comprises an indicator vector that one-hot encodes the annotated class of the word.

6. The method of claim 1, wherein, for each of the at least one of the plurality of words whose annotation data represents an annotation indicating an annotated class of the word, the model output data comprises a vector that encodes probabilities predicted by the model that the word belongs to each of the classes under consideration.

7. The method of claim 1, wherein, for each of the at least one of the plurality of words whose annotation data represents an annotation indicating that the word does not belong to any class from among the subset of classes under consideration, the second loss term includes a negative log probability of the NLP model's predicted class membership of the word not being among the subset of classes under consideration.

8. The method of claim 7, wherein, for each of the at least one of the plurality of words whose annotation data represents an annotation indicating that the word does not belong to any class from among the subset of classes under consideration, the second loss term includes a negative log of a quantity equal to one minus a sum of probabilities predicted by the model that the word belongs to each of the subset of classes under consideration.

9. The method of claim 1, wherein, for at least one of the plurality of words, the subset of classes under consideration for the word contains a single specified class under consideration.

10. The method of claim 9, wherein, for each of the at least one of the plurality of words whose annotation data represents an annotation indicating that the word does not belong to a single specified class under consideration, the second loss term includes a negative log probability of the NLP model's predicted class membership of the word not belonging to the specified class.

11. The method of claim 10, wherein, for each of the at least one of the plurality of words whose annotation data represents an annotation indicating that the word does not belong to a single specified class under consideration, the second loss term includes a negative log of a quantity equal to one minus a probability predicted by the model that the word belongs to the specified class.

12. The method of claim 1, wherein said defining the model input data includes mapping each of the plurality of words to a respective vector.

13. A computer program product comprising one or more non-transitory program storage media on which are stored instructions executable by one or more processors or programmable circuits to perform operations for training a natural language processing (NLP) model, the operations comprising:

storing classification data associated with a plurality of words, the classification data including, for each of the plurality of words, class subset data representative of a subset of classes under consideration for the word and annotation data representative of an annotation of the word, the annotation of at least one of the plurality of words indicating an annotated class of the word from among the subset of classes under consideration, the annotation of another at least one of the plurality of words indicating that the word does not belong to any class from among the subset of classes under consideration;

defining model input data associated with each of the plurality of words;

evaluating a cross entropy loss function to derive a loss value, the cross entropy loss function having a first loss term for each item of the model input data that is associated with a word whose annotation data represents an annotation indicating an annotated class of the word from among the subset of classes under consideration, the cross entropy loss function having a second loss term for each item of the model input data that is associated with a word whose annotation data represents an annotation indicating that the word does not belong to any class from among the subset of classes under consideration, the first loss term defining a cross entropy loss between model output data representative of the NLP model's predicted class membership of the word and the annotation data of the word, the second loss term defining a probability of the NLP model's predicted class membership of the word not being among the subset of classes under consideration; and adjusting the NLP model according to the loss value derived from the cross entropy loss function.

14. A system for training a natural language processing (NLP) model, the system comprising:

one or more databases for storing classification data associated with a plurality of words, the classification data including, for each of the plurality of words, class subset data representative of a subset of classes under consideration for the word and annotation data representative of an annotation of the word, the annotation of at least one of the plurality of words indicating an annotated class of the word from among the subset of classes under consideration, the annotation of another at least one of the plurality of words indicating that the word does not belong to any class from among the subset of classes under consideration; and one or more computers for defining model input data associated with each of the plurality of words, evaluating a cross entropy loss function to derive a loss value, and adjusting the NLP model according to the loss value derived from the cross entropy loss function, the cross entropy loss function having a first loss term for each item of the model input data that is associated with a word whose annotation data represents an annotation indicating an annotated class of the word from among the subset of classes under consideration, the cross entropy loss function having a second loss term for each item of the model input data that is associated with a word whose annotation data represents an annotation indicating that the word does not belong to any class from among the subset of classes under consideration, the first loss term defining a cross entropy loss between model output data representative of the NLP model's predicted class membership of the word and the annotation data of the word, the second loss term defining a probability of the NLP model's predicted class membership of the word not being among the subset of classes under consideration.

15. A method of training a natural language processing (NLP) model, the method comprising:

storing classification data associated with a plurality of words, the classification data including, for each of the plurality of words, annotation data representative of an annotation of the word, the annotation of at least one of the plurality of words indicating an annotated class of the word, the annotation of another at least one of the plurality of words indicating that the word is not to be classified by the model;

defining model input data associated with each of the plurality of words;

evaluating a cross entropy loss function to derive a loss value, the cross entropy loss function defining, for each item of the model input data, a weighted cross entropy loss between model output data representative of the NLP model's predicted class membership of the word and the annotation data of the word, the weighted cross entropy loss for a word whose annotation indicates that the word is not to be classified by the model being given less weight; and adjusting the NLP model according to the loss value derived from the cross entropy loss function.

16. A method of training a natural language processing (NLP) model, the method comprising:

storing classification data associated with a plurality of words, the classification data including, for each of the plurality of words, annotation data representative of one or more annotations of the word indicating an annotated class of the word, the annotation data of at least one of the plurality of words being representative of two or more annotations indicating different annotated classes of the word;

defining model input data associated with each of the plurality of words;

evaluating a cross entropy loss function to derive a loss value, the cross entropy loss function defining, for each item of the model input data, a cross entropy loss between model output data representative of the NLP model's predicted class membership of the word and the annotation data of the word, wherein, for each item of the model input data whose annotation data represents two or more annotations indicating different annotated classes of the word, the cross entropy loss function defines a probability of the NLP model's predicted class membership of the word being among the different annotated classes; and adjusting the NLP model according to the loss value derived from the cross entropy loss function.

17. A method of training a natural language processing (NLP) model, the method comprising:

storing classification data associated with a plurality of words, the classification data including, for each of the plurality of words, annotation data representative of an annotation of the word indicating an annotated class of the word from among a plurality of classes;

defining a hierarchical tree structure relating the plurality of classes, at least one of the classes being an ancestor class to one or more of the plurality of classes including at least one childless class;

defining model input data associated with each of the plurality of words;

evaluating a cross entropy loss function to derive a loss value, the cross entropy loss function defining, for each item of the model input data, a cross entropy loss between model output data representative of the NLP model's predicted class membership of the word and the annotation data of the word, wherein, for each item of the model input data whose annotation data represents an ancestor class to one or more of the plurality of classes including at least one childless class, the cross entropy loss function defines a probability of the NLP model's predicted class membership of the word being among the at least one childless class; and adjusting the NLP model according to the loss value derived from the cross entropy loss function.

* * * * *